United States Patent [19]
Reimann

[11] Patent Number: 4,987,781
[45] Date of Patent: Jan. 29, 1991

[54] ACCELEROMETER CHIP

[75] Inventor: Hans Reimann, Sunnyvale, Calif.

[73] Assignee: SenSym, Incorporated, Sunnyvale, Calif.

[21] Appl. No.: 347,598

[22] Filed: May 3, 1989

[51] Int. Cl.$^5$ .............................................. G01P 15/08
[52] U.S. Cl. .................................... 73/517 R; 357/25
[58] Field of Search ..................... 73/517 R, 654, 662; 357/25

[56] References Cited

U.S. PATENT DOCUMENTS

| 4,050,049 | 9/1977 | Youmans | 73/517 R X |
| 4,430,895 | 2/1984 | Colton | 73/497 |
| 4,498,342 | 2/1985 | Aske | 73/517 B |
| 4,522,072 | 6/1985 | Sulouff et al. | 73/765 |
| 4,670,092 | 6/1987 | Motamedi | 357/26 X |
| 4,849,695 | 7/1989 | Muller et al. | 357/27 X |

FOREIGN PATENT DOCUMENTS 110262 4/1989 Japan ...................................... 73/654

OTHER PUBLICATIONS

Roylance, L. M., A Batch-Fabricated Silicon Accelerometer, IEEE Transactions on Silicon Devices, vol. ED-25, No. 12, Dec. '79, pp. 1911-1917.

Primary Examiner—Jerry W. Myracle
Attorney, Agent, or Firm—Skjerven, Morrill, MacPherson, Franklin & Friel

[57] ABSTRACT

A silicon accelerometer chip has a seismic mass (which is a gold sphere) fixed in a cavity formed in a boss supported by beams. Pizeo-resistors forming a Wheatstone bridge are formed in the beams. The cavity is formed by anisotroptically etching the boss, so that the cavity is self-aligned to the sphere.

17 Claims, 3 Drawing Sheets

ACCELEROMETER CHIP

BACKGROUND OF THE INVENTION

1. Field of the Invention

This invention relates to an accelerometer. Specifically, the invention relates to an accelerometer chip having an added seismic mass to enhance its performance, and to the process used to fabricate the chip.

2. Description of the Prior Art

A schematic diagram of a prior art silicon accelerometer chip including a Wheatstone bridge is shown in FIG. 1. Eight resistors 10A, 10B, 10C, 10D, 10E, 10F, 10G, and 10H, are typically provided with two resistors in series in each arm of the bridge, although four resistors, with just one resistor in each arm can be used. A voltage $V_s$ (about +5 volts) is provided to terminal 12. Terminal 14 is grounded. An output voltage $\Delta V$ is measured across terminals 16 and 18. Output voltage $\Delta V$ is a function of the mechanical stress in the silicon substrate on which the resistors are formed, and the differing location of the resistors as shown by the arrows is such that in response to an acceleration which puts a mechanical stress on the silicon substrate, the magnitude and direction of the acceleration is sensed in terms of $\Delta V$.

In the prior art a three part silicon accelerometer chip as shown in FIG. 2 in cross section is typically provided to implement the circuit of FIG. 1. There is base layer chip 20, on top of which is provided the active chip layer 22, and on top of the active chip layer is the cover chip layer 24. The active chip layer includes a beam structure 26 in which are formed piezo resistors 28A, 28B, which form a part of a conventional Wheatstone bridge as described above. Deflection stops such as 30A, 30B are micro-machined in both the cover 24 and the base layers 20 to limit the amount of travel of the boss 32 and thus protect the beam 26 which supports the boss 32 from breaking in the event of over acceleration (i.e., shock). Metal pads such as 34 are provided on the active chip layer 22 for providing interconnection from the outside of the chip to the piezo-resistors 28A, 28B and thus to the Wheatstone bridge. Air gaps such as 36A, 36B are also provided between the cover layer 24 and the active chip layer 22 and between the active chip layer 22 and the base chip layer 20 to provide damping. A gap 37 is formed between the boss 32 and the surrounding periphery of the active chip layer 22. This device is typically formed by well known semiconductor processes.

It is known that the performance parameters sensitivity S and resonant frequency f of such a structure are interdependent. Both depend on the seismic mass M of the boss. S is proportional to M and f is proportional to $1/\sqrt{M}$. A low cost silicon accelerometer device requires a small chip size (typically four millimeter by four millimeter). This small chip size limits the seismic mass because the density of silicon is low (about 2.3 grams per cubic centimeter). For some applications, bridge-type accelerometers as shown in FIG. 2 having one or more beams spanning a gap have a favorable frequency response and cross sensitivity, but the sensitivity is limited and lower than the sensitivity of a cantilever type accelerometer having a single beam connected to a boss unsupported at one end. Thus the prior art device has less sensitivity than desired for most applications.

Also known in the prior art is a cantilever (i.e., a single beam) structure in a silicon accelerometer chip with a layer of metal such as gold deposited on top of the cantilever boss (or paddle) to provide a seismic mass, to make the chip more sensitive to acceleration.

This prior art approach has the drawback that it is difficult to manufacture in terms of alignment. Also, forming the metal layer requires additional semiconductor processing steps to deposit the metal. Also, such metal layer may interfere with the micro-machining of the mechanical (i.e., beam) structure.

SUMMARY OF THE INVENTION

In accordance with the invention, an accelerometer chip is formed in a silicon substrate or a similar material. Resistors are formed in the substrate in structures such as beams which deform under mechanical stress, so that the resistance of the resistors is a function of the stress. A cavity formed in the substrate holds a seismic mass, which is preferably a sphere of a material such as gold, which is denser than the substrate material.

The device is preferably an integrated silicon chip manufactured by semiconductor processing methods in a batch process of several hundred chips per wafer. The wafer is a simple single crystal silicon with <100> orientation. A seismic mass is fixed in the cavity. The preferred accelerometer structure consists of a rigid frame and a central boss connected to the frame by thin beams. The boss acts as a seismic mass and the beams as springs. Micro-machining by means of an anisotropic etchant forms a rectangular cavity in the boss with sidewalls at an angle of 54.7 degrees from the principal surface of the chip. The accelerometer can be a cantilever structure with beams at one side of the boss, or alternatively a bridge-type structure with beams at opposite sides. The sensitivity axis is in the vertical direction relative to a principal surface of the silicon chip. A deflection of the seismic mass due to its inertia or the presence of gravitation leads to a stress distribution in the beams.

Piezo-resistors are ion implanted at points of high stress in the structure. Resistance changes in the resistors are proportional to stress. Resistance increases for a longitudinal resistor in tension and decreases for a longitudinal resistor in compression, or for transverse resistors in tension. Positive and negative going piezo-resistors are arranged in a Wheatstone bridge resulting in a differential output voltage proportional to acceleration (i.e., applied force). Alternatively, a conventional four terminal resistor responding to shear stress can be used. In another embodiment, the resistors are connected in a half bridge.

The anisotropically etched cavity and the sphere are thus self-aligning, and simplify manufacturing by providing precise dimensioning relative to each other.

The key parameters of an accelerometer chip are sensitivity in micro volt per volt per 2, micro volt output per voltage supply per acceleration unit, and bandwidth in hertz. Bandwidth is determined by resonant frequency and quality factor (or damping factor) of the resonance. The intrinsic quality factor of the silicon structure is very high and damping is required to prevent ringing.

The accelerometer chip preferably consists of a bonded sandwich of three wafers. The base and cover wafers are micromachined to supply deflection stops for shock resistance and to provide pockets defining gaps for air damping. A fully featured accelerometer in accordance with the invention includes (1) a bridge type structure for a low cross-sensitivity (low cross-sensitivity is low sensitivity to acceleration along axes perpendicular to the vertical axis), (2) deflection stops to limit beam movement, (3) air damping of boss movement, (4) eight piezo-resistors in order to reject higher mode dynamics, that is rocking and twisting of seismic mass, and (5) thickness control of the beams through electrochemical etch stop techniques.

BRIEF DESCRIPTION OF THE DRAWINGS

Similar reference numerals in different figures denote similar or identical structures.

DETAILED DESCRIPTION OF THE INVENTION

Figure 3:
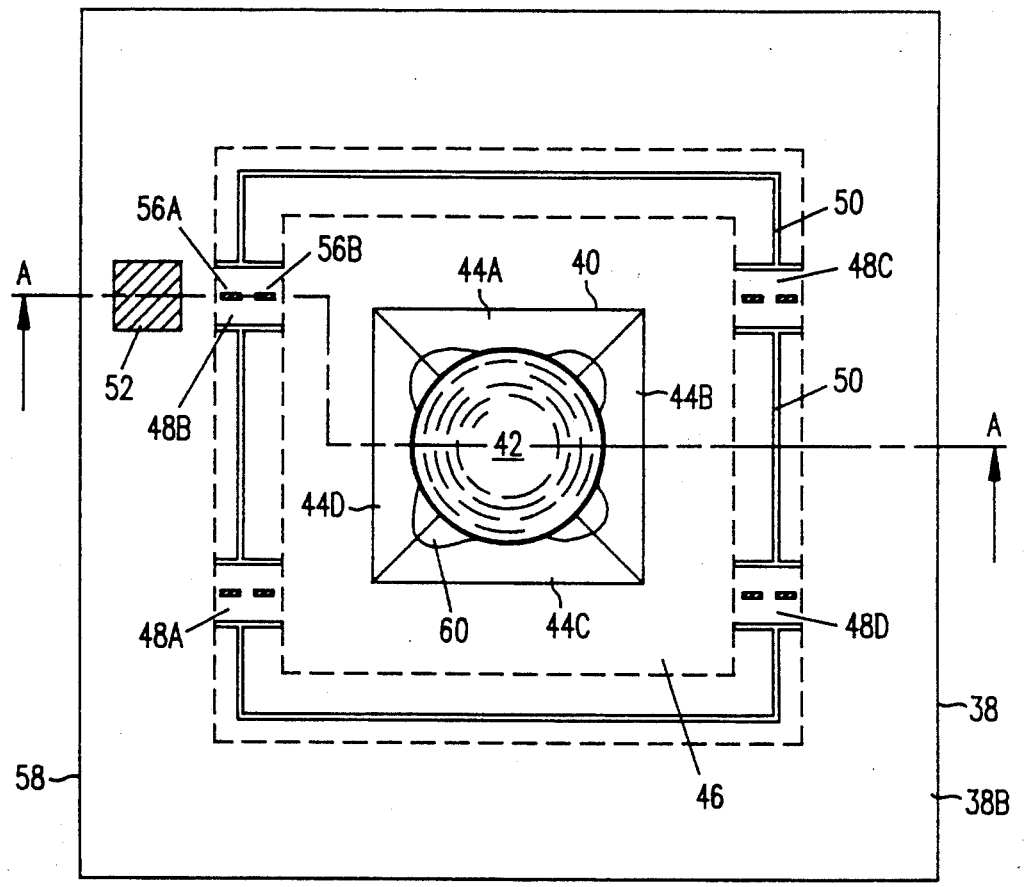
FIG. 3 shows a top view of a chip in accordance with the inventions.

As shown in top view in FIG. 3, the device in accordance with the invention is an approximately square silicon chip device, approximately 160 mils (four millimeters) on a side. In the center of the device in the active wafer 38 a cavity 40 is formed which is preferably square in shape at the principal surface 38B of the active wafer 38. Fixed in the cavity 40 is a sphere 42 which rests on the sidewalls 44A, 44B, 44C, 44D of the cavity. The sphere 42 serves as a seismic mass to enhance the sensitivity of the chip and preferably is pure gold, with a density of 19.3 gm/cm$^3$. The gold sphere 42 used in the preferred embodiment is supplied by Williams Precision Metals, Buffalo, N.Y.

The cavity 40 is formed in an area of silicon 46 (called the boss) which in turn is connected to four beams 48A, 48B, 48C, 48D which are conventionally micro-machined in the silicon chip. Surrounding the beams 48A, 48B, 48C, 48D and the boss 46 is a gap 50. Adjacent to each of the beams 48A, 48B, 48C, 48D on the surface of the active layer 38 along the periphery of the chip are provided several metal pads such as 52 for electrical interconnection to the resistors 56A, 56B, ..., etc. formed in each beam. Also provided on the surface of active layer 38 are metal interconnect lines (not shown) preferably conventionally formed of aluminum on the surface 38B of the chip to connect the piezo-resistors 56A, 56B, ..., etc. to form the Wheatstone bridge. The periphery 58 of the chip is referred to as the "frame," and this is the area on which the metal pads and part of the metal interconnect are formed. Each piezo-resistor 56A, 56B, ..., etc. is preferably a P type resistor, formed by ion-implantation. Each resistor 56A, 56B, ..., etc. is connected conventionally to its metallization leads by an intermediate conductive diffused P+ type region (not shown).

Figure 4:
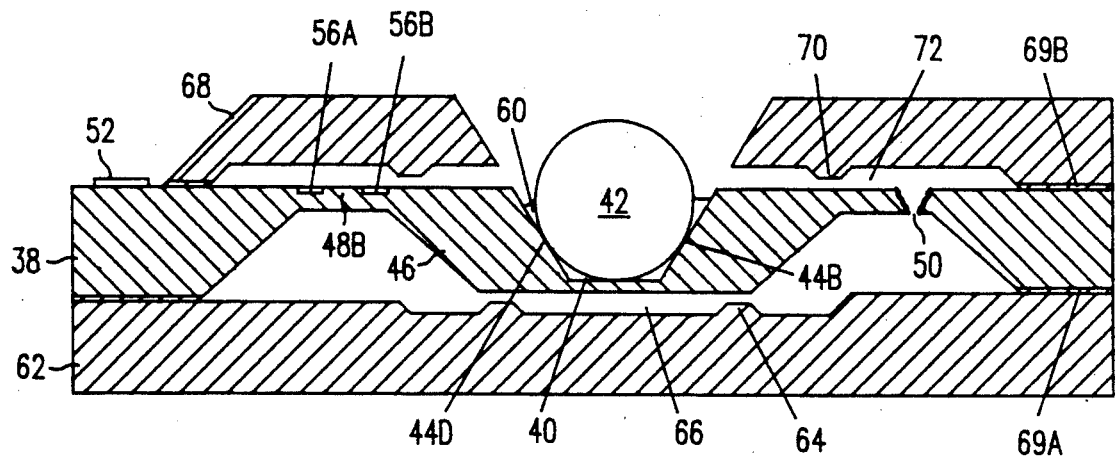
FIG. 4 shows a cross sectional view of the view of FIG. 3.

FIG. 4 shows a cross-section through line A—A on FIG. 3. As shown in FIG. 4, the seismic mass is a sphere 42 which is located in the tub 40 (i.e., cavity). The seismic mass 42 is preferably bonded to the sidewalls 44D, 44B of the cavity 40 by an adhesive bonding agent 60 as shown. The adhesive 60 is preferably a conventional epoxy material. Alternatively, the sphere 42 is bonded to the cavity sidewalls 44D, 44B by a gold-silicon eutectic. As another alternative bonding method, low melting temperature alloy is used as a bonding agent with conventional reflow, thus providing added mass. Also shown is the boss 46, which is the structure in which the tub 40 is formed. Adjacent to the boss 46 is shown one of the beams 48. As shown, the piezo-resistors 56A, 56B are formed in the beam 48. The base chip layer 62 includes conventional deflection stops such as 64 and a conventional air gap 66 is provided between base chip layer 62 and active chip layer 38. Also, the cover chip layer 68 includes deflection stops such as 70 and an air gap 72 is provided between active chip layer 38 and cover chip layer 68. The base chip layer 62 is bonded at 69A to the active chip layer 38 and the cover chip layer 68 is bonded to the active chip layer 38 at 69B also. The bonding is performed by conventional aluminum-to-silicon bonding.

The device thus includes a micro-machined boss 46 with a tub-shaped cavity 40, the tub being a well-defined obelisk shaped (i.e., a frustum of a pyramid having a square base) cavity 40 formed in the active silicon wafer 38, with a dense sphere 42 precisely positioned in the cavity 40, to align the center of gravity of the seismic mass 42 with the beam axis of the beams such as 48B. Positioning of the sphere 42 is by dimensional tolerance of micro-machined structures. In accordance with the invention, automatic equipment is used for dispensing the adhesive in the tub 40 and positioning of the sphere 42. The deflection stops such as 64, 70 protect the beam structure such as 48B from breakage. One bonding pad 52 is also shown.

In accordance with the invention, the silicon boss 46 itself has a mass of about 2 milligrams. Without the added seismic mass, the accelerometer chip sensitivity is about 400 microvolt per volt per g. The resonance frequency is about 2,000 Hertz. With the added seismic mass of about 10 milligrams due to the gold sphere, there is an improvement in the sensitivity to two millivolts per volt per g, the resonant frequency is decreased to about 900 Hertz.

Figure 1:
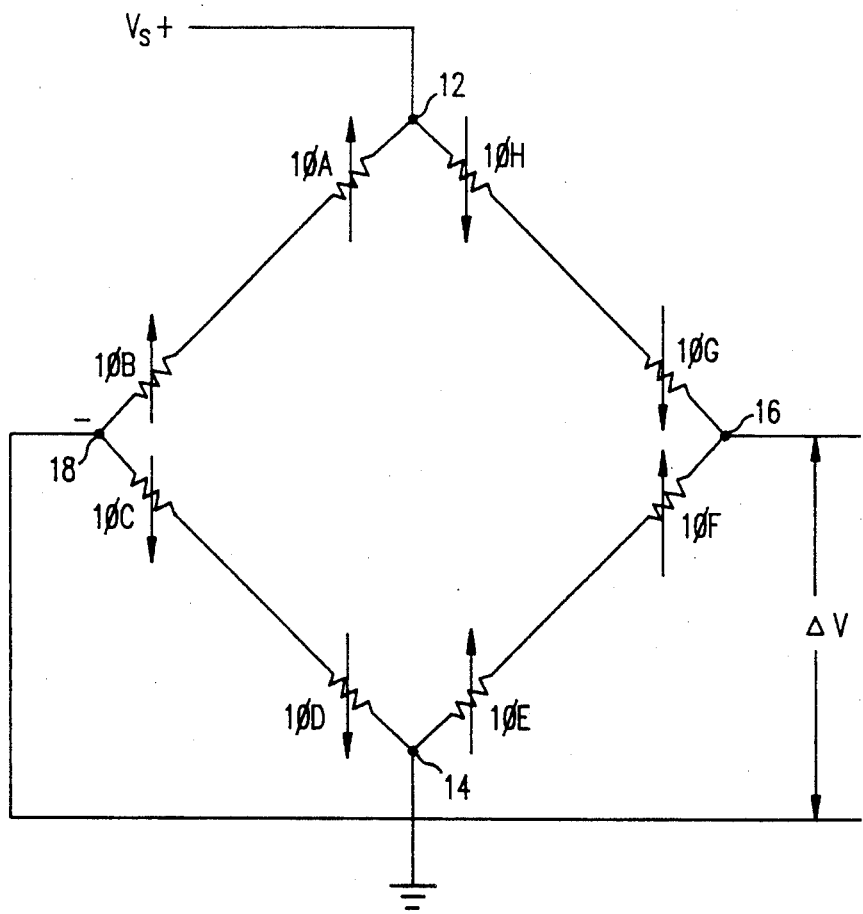
FIG. 1 shows a schematic diagram of a prior art Wheatstone bridge.
Figure 2:
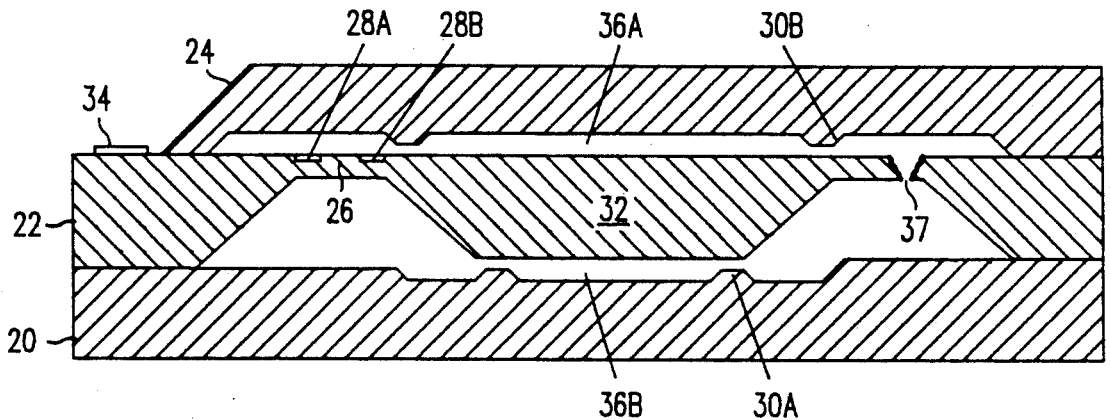
FIG. 2 shows a cross sectional view of a prior art accelerometer chip.
Figure 5:
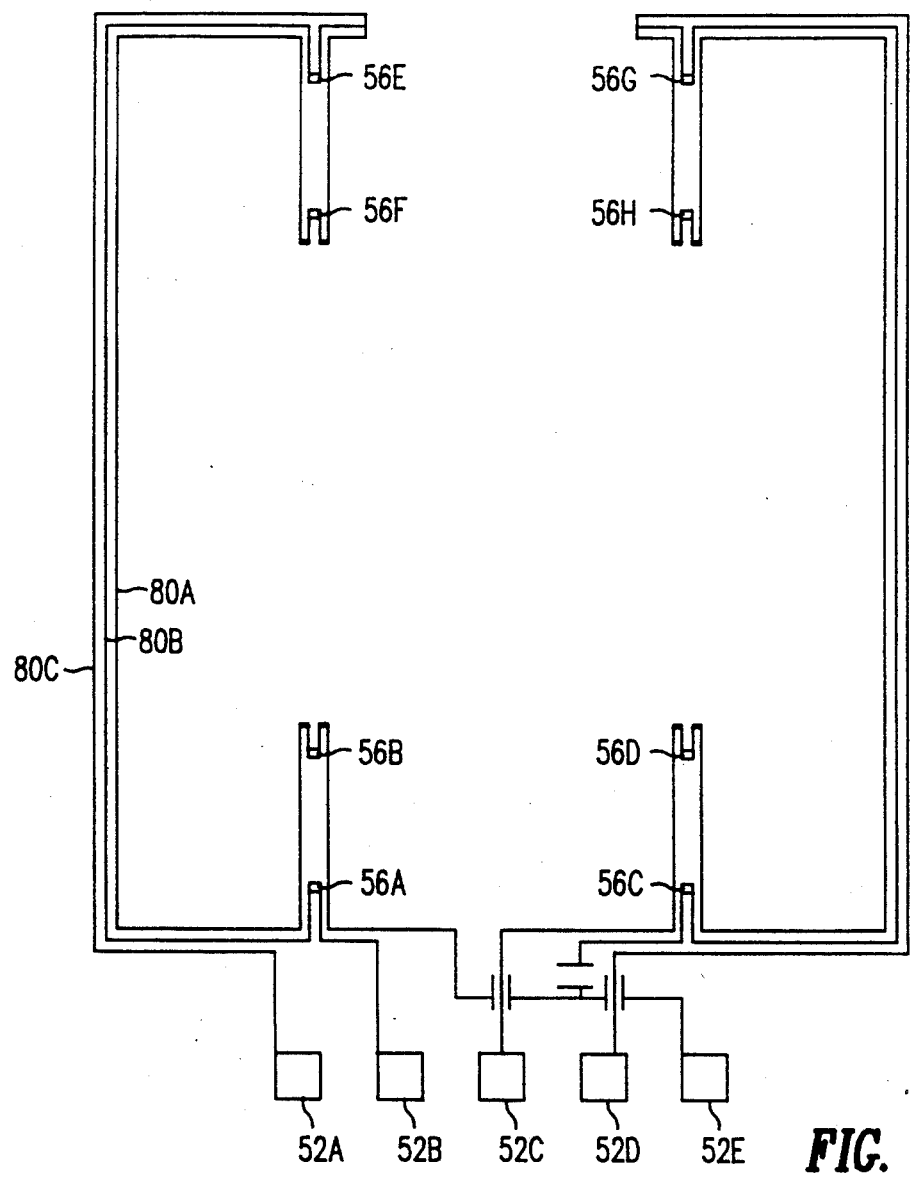
FIG. 5 shows the electrical interconnect patterns in accordance with the invention.

The electrical layout of the bonding pads, electrical interconnections, and resistors is shown in FIG. 5 for the preferred embodiment. The bonding pads 52A, 52B, and 52E correspond to terminals 14, 16, and 18 in FIG. 1. Bonding bads 52C and 52D with an external connection (not shown) correspond to terminal 12 in FIG. 1. This open Wheatstone bridge circuit is used to connect a conventional external bridge-balancing resistor (not shown) to the bridge circuit. Thus the electrical connections as shown are open between bonding pad 52C and bonding pad 52D.

As seen in FIG. 5, eight resistors 56A, 56B, ..., 56H are preferably provided. Each end of each resistor is connected to a metallization lead such as 80A, 80B, 80C. The four resistors 56A, 56C, 56E, 56G located nearest the periphery of the chip are the positive-going resistors for a downwards application of force and are connected by the metallization leads such as 80A, 80B, 80C so that the resistors 56A and 56E are in series, forming one arm of the bridge. Similarly, resistors 56C and 56G are in series. The resistors 56B, 56D, 56F, and 56H towards the center of the chip are the negative-going resistors and are also connected in series, so that resistors 56B and 56F are in series. In another embodiment, the resistors are connected in series crosswise, so that for instance resistors 56A and 56G are in series.

This crosswise series connection provides more accurate output of the bridge when it is in the twisting mode.

In the preferred embodiment, the device has these approximate dimensions:

Chip size: 160 mils square (4 mm)
Inside edge of frame (at top surface of active chip layer): 100 mils square (2.5 mm)
Boss (at top surface): 70 mils square (1.75 mm)
Each beam: 15 mils long (0.37 mm), 6 mils wide (0.15 mm), 0.4 mils thick (10 μm)
Maximum thickness of active chip layer: 18 mils (450 μm)
Depth of cavity: 16 mils (400 μm) (from top surface of active chip layer).
Diameter of sphere: 40 mils (1 mm)
Width of gap between boss and cover: 0.12 mils (3 μm)

These dimensions are illustrative and not critical to the invention.

The method of fabricating the above-described accelerometer chip, in its preferred embodiment, is as follows. An N type epitaxial layer is conventionally grown on one surface of a silicon wafer having a <100> orientation. It is understood that hundreds of accelerometer chips are fabricated simultaneously on the wafer. Both the front (the side with the epitaxial layer) and back sides of the wafer are oxidized to form a layer of silicon dioxide. A photoresist mask layer is applied and patterned and corresponding openings are formed in the front side oxide layer. Through these openings, boron is deposited and diffused to form the P+ type conductive areas having a resistance of 10 Ω/square which will connect the resistors to the metallization leads.

Then the wafer is reoxidized. A second mask layer is applied patterned to form openings in the front side oxide layer. This is the resistor mask layer. The wafer is reoxidized to form a thin oxide layer over the openings. Boron is ion-implanted and driven in the openings to form the P type resistors having a resistance of about 300 Ω/square.

Then the oxide is stripped off and a thinner oxide is regrown. The wafer is nitrogen annealed to control the fixed charges. Then in a third mask step, another photoresist mask layer is applied and patterned and openings are formed in the oxide layer for the sixteen (two per resistor) contacts which connect the ends of the metallization leads to the conductive areas which contact each resistor. Then the front side of the wafer is covered with an aluminum deposition layer, which is etched to form the metallization leads and bonding pads. Low resistance contacts between the aluminum and silicon are formed by alloying. This completes the fabrication of the electrical parts of the device on the active chip layer.

Then the active chip layer is micro-machined to form the mechanical structures on it as follows. Silicon nitride is deposited on the front and back sides of the wafer by plasma deposition. Both the front and back sides are subject to photolithography to pattern the silicon nitride layer to expose the areas of the wafer to be removed subsequently.

On the front side, an anisotropic etching using EDPW (or KOH) as the etchant is performed to form the cavity between the boss and the frame, and also to form the tub in the boss. The length of etch time is controlled to control the depth of the cavity between the boss and frame. Simultaneously, on the back side, the areas under the beams are anisotropically etched.

Then by means of electrochemical etching, the cavity between the boss and frame is completed by isotropically etching to the epitaxial layer interface. This electrochemical etching only removes material from the back side of the wafer because there is no N+ area on the front side, and the electrochemical etching preferentially removes N+ material.

Then the silicon nitride layer is stripped, and the active chip layer wafer is complete.

The base chip layer and the cover chip layer are formed respectively in a second and a third wafer by a micro-machining process as described above. In these steps, the deflection stops in the cover and base chip layers are formed by a two step anisotropic etch. A deep anisotropic etch from the front side of the cover chip layer breaks through to the active layer, so as to form an opening for insertion of the gold sphere. Also, openings are formed by the same anisotropic etching to provide access through the cover layer to the bonding pads. Then the base chip layer is bonded to the back side of the active chip layer, and the cover chip is bonded to the front side of the active chip layer by silicon-aluminum bonds. This involves depositing aluminum on one surface to be bonded, pressing the two surfaces together, and heating.

Then, the gold sphere is bonded to the tub preferably by epoxy adhesive. The wafer is then conventionally sawed into chips, separated, and the chips are packaged and tested.

Figure 6:
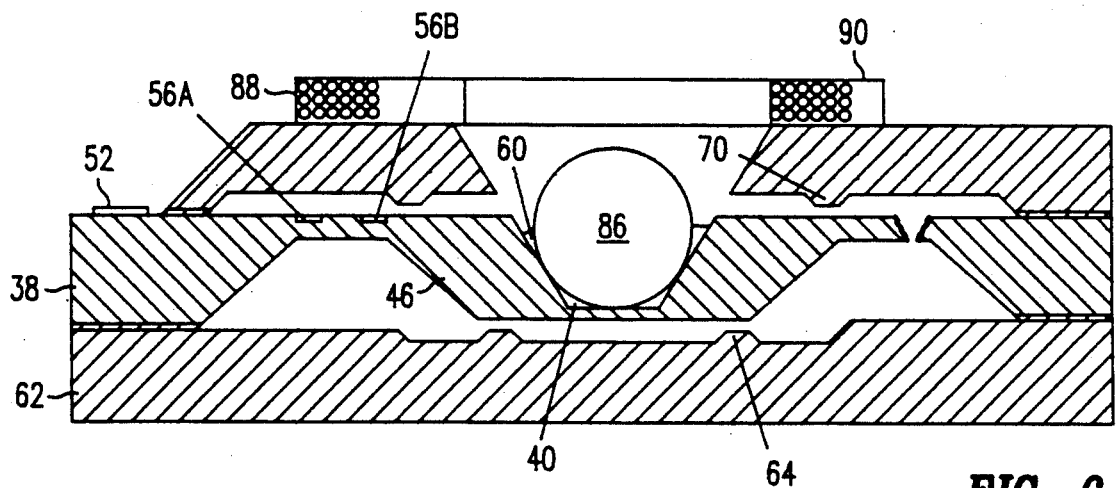
FIG. 6 shows a magnetically actuated chip in accordance with the invention.

An alternative embodiment of the invention as shown in FIG. 6 includes a magnetic actuator. In this embodiment, a sphere 86 formed of ferrite or iron or steel or similar magnetically susceptible material is used instead of a gold sphere as the seismic mass. A coil 88 (i.e., electromagnetic inductor) is positioned over the chip. The coil 88 is a conventional wire wound coil on a form 90 in one embodiment, or a conventional printed coil in a second embodiment. The magnetostatic force exerted by the coil 88 on the sphere 86 when current is passed through the coil 88 deflects the boss 46 in the chip and results in an electrical output signal ΔV of the accelerometer chip. This accelerometer chip with the inductor allows testing of proper operation of the chip. This testing capability is important for seldom used safety devices such as an automobile crash sensor used to fire an air bag in an automobile. It would also be useful for such applications as arming ammunition which would only have to work once in a lifetime of many years. The other elements of the embodiment of FIG. 6 are similar to those shown in FIG. 4.

The above description of the invention is descriptive and not limiting. Further embodiments of the invention will be apparent in light of the above description.

I claim:

1. A semiconductor chip accelerometer comprising:
   a semiconductor substrate;
   resistance means formed in the semiconductor substrate for providing an electric resistance as a function of force on the substrate;
   a cavity defined by the substrate; and
   a body fixed in the cavity for exerting a force on the substrate.

2. The claim of claim 1 wherein the body is substantially spherical in shape.

3. The device of claim 1 wherein the body is substantially comprised of gold.

4. The device of claim 1 wherein the cavity is substantially obelisk shaped.

5. The device of claim 4 wherein the cavity has sidewalls having an angle of about 54.7 degrees to a principal surface of the substrate.

6. The device of claim 5 wherein the body is bonded to the sidewalls by epoxy.

7. The device of claim 5 wherein the body is bonded to the sidewalls by a eutectic.

8. The device of claim 5, further comprising a cover affixed to the principal surface of the substrate and including deflection stops formed in the cover to limit movement of a portion of the principal surface.

9. The device of claim 1 wherein the resistance means comprises ion-implanted resistors formed in beams bridging a gap defined by the substrate.

10. The device of claim 9 wherein the resistors form a Wheatstone bridge.

11. The device of claim 1 wherein the substrate comprises silicon having a <100> orientation.

12. The device of claim 1, wherein the body comprises a magnetically susceptible material; and, further comprising an inductor located in juxtaposition to the body, wherein the body is movable upon operation of the inductor.

13. A method for forming a semiconductor accelerometer chip comprising the steps of:
providing a substrate;
forming resistors in the substrate, the resistors having a resistance which is a function of a deformation of the substrate;
forming a cavity in the substrate; and
fixing a body in the cavity.

14. The method of claim 13, further comprising the step of forming the resistors in a beam spanning a gap in the substrate.

15. The method of claim 13, wherein the step of forming the cavity comprises the step of anisotropically etching the cavity in the substrate.

16. The method of claim 13, wherein the body is substantially spherical and is substantially comprised of gold.

17. A semiconductor accelerometer chip comprising:
a semiconductor substrate;
resistance means formed in the semiconductor substrate for providing an electric resistance as a function of force on the substrate;
a cavity defined by the substrate;
a magnetically susceptible body fixed in the cavity for exerting a force on the substrate; and
an inductor located in juxtaposition to the magnetically susceptible body, wherein the body is movable upon operation of the inductor thereby moving the substrate.

* * * * *